(12) United States Patent
Adkins et al.

(10) Patent No.: US 11,111,374 B2
(45) Date of Patent: Sep. 7, 2021

(54) MULTIVALENT CATION-CONTAINING COPOLYMER, PROCESS FOR PRODUCTION THEREOF AND USE THEREOF TO TREATING AQUEOUS DISPERSIONS

(71) Applicant: BASF SE, Ludwigshafen am Rhein (DE)

(72) Inventors: Stephen John Adkins, Cleckheaton (GB); Holger Misslitz, Seeon (DE); Mitchell Louis Catling, Tucson, AZ (US)

(73) Assignee: BASF SE, Ludwigshafen (DE)

( * ) Notice: Subject to any disclaimer, the term of this patent is extended or adjusted under 35 U.S.C. 154(b) by 365 days.

(21) Appl. No.: 15/776,120

(22) PCT Filed: Nov. 14, 2016

(86) PCT No.: PCT/EP2016/077515
§ 371 (c)(1),
(2) Date: May 15, 2018

(87) PCT Pub. No.: WO2017/084986
PCT Pub. Date: May 26, 2017

(65) Prior Publication Data
US 2018/0327585 A1 Nov. 15, 2018

Related U.S. Application Data

(60) Provisional application No. 62/255,898, filed on Nov. 16, 2015.

(51) Int. Cl.
*C08L 33/26* (2006.01)
*C02F 1/56* (2006.01)
(Continued)

(52) U.S. Cl.
CPC ............... *C08L 33/26* (2013.01); *C02F 1/56* (2013.01); *C02F 11/14* (2013.01); *C08F 220/06* (2013.01);
(Continued)

(58) Field of Classification Search
CPC ..................................................... C08L 33/26
See application file for complete search history.

(56) References Cited

U.S. PATENT DOCUMENTS

2004/0149630 A1* 8/2004 Weir ..................... B01D 21/01
209/5
2007/0225422 A1* 9/2007 Sakamoto ................ C08F 2/44
524/458
(Continued)

FOREIGN PATENT DOCUMENTS

| CA | 2 346 249 A1 | 4/2000 |
|---|---|---|
| CA | 2803904 A1 | 2/2012 |

(Continued)

OTHER PUBLICATIONS

International Search Report dated Feb. 22, 2017, in PCT/EP2016/077515, filed Nov. 14, 2016.
(Continued)

*Primary Examiner* — Peter Keyworth
(74) *Attorney, Agent, or Firm* — Grüneberg and Myers PLLC (57) ABSTRACT

There is disclosed a multivalent cation containing copolymer derived from one or more ethylenically unsaturated acids. The copolymer has the following characteristics: (a) an intrinsic viscosity of at least about 3 dl/g when measured in 1 M Na Cl solution at 25° C.; (b) the copolymer is derived
(Continued)

from a monomer mixture comprising an ethylenically unsaturated acid and at least one comonomer, the ethylenically unsaturated acid present in an amount in the range of from about % to about 65% by weight; and (c) a residual comonomer content is less than 1000 ppm when the comonomer is an acrylamide. The copolymer, inter alia, is useful as a flocculant for treating an aqueous slurry comprising particulate material, preferably tailings from a mining operation.

49 Claims, 2 Drawing Sheets

(51) Int. Cl.
  *C02F 11/14*     (2019.01)
  *C08F 220/06*    (2006.01)
  *C08F 220/56*    (2006.01)
  *C09K 8/035*     (2006.01)
  *C02F 103/10*    (2006.01)
  *C08F 222/04*    (2006.01)
  *C08F 220/58*    (2006.01)

(52) U.S. Cl.
  CPC ............ *C08F 220/56* (2013.01); *C09K 8/035* (2013.01); *C02F 2103/10* (2013.01); *C08F 220/58* (2013.01); *C08F 220/585* (2020.02); *C08F 222/04* (2013.01)

(56) References Cited

U.S. PATENT DOCUMENTS

| | | | |
|---|---|---|---|
| 2013/0186838 | A1 | 7/2013 | Sortwell |
| 2013/0190431 | A1* | 7/2013 | Sortwell ............... C08F 222/02 524/60 |
| 2014/0246377 | A1* | 9/2014 | Bierganns ............... C02F 1/547 210/732 |
| 2015/0353664 | A1 | 12/2015 | Sortwell |

FOREIGN PATENT DOCUMENTS

| | | | |
|---|---|---|---|
| CA | | 2803025 A1 | 4/2013 |
| EP | | 0388108 A2 | 9/1990 |
| WO | WO 96/5146 A1 | | 2/1996 |
| WO | WO 97/06111 A1 | | 2/1997 |
| WO | WO 01/05712 A1 | | 1/2001 |
| WO | WO 01/92167 A1 | | 12/2001 |
| WO | WO 2004/060819 A1 | | 7/2004 |
| WO | WO 2012/018514 A2 | | 2/2012 |
| WO | WO 2013/112430 A1 | | 8/2013 |

OTHER PUBLICATIONS

Combined Chinese Office Action and Search Report dated Apr. 29, 2020 in Chinese Patent Application No. 201680066575.0, citing document AX therein, 7 pages.

Hongjian, J., et al., "Copolymerization of Acrylamide-Sodium Acrylate in Aqueous Solution", Chinese Journal of Applied Chemistry, vol. 3, No. 3, Jun. 1986, pp. 45-49 (with English translation).

* cited by examiner

MULTIVALENT CATION-CONTAINING COPOLYMER, PROCESS FOR PRODUCTION THEREOF AND USE THEREOF TO TREATING AQUEOUS DISPERSIONS

BACKGROUND OF THE INVENTION

Field of the Invention

In one of its aspects, the present invention relates to a multivalent cation-containing copolymer. In another of its aspects, the present invention relates to a process for producing a multivalent cation-containing copolymer. In yet another of its aspects, the present invention relates to the use of a multivavlent cation-containing copolymer to treat an aqueous slurry such as a tailings stream from a mineral processing operation.

Description of the Prior Art

Processes of treating mineral ores, coal or oil sands in order to extract mineral values or in the case of oil sands to extract hydrocarbons, or coal will normally result in waste material from the beneficiation processes. Often the waste material consists of an aqueous slurry or sludge comprising particulate mineral material, for instance clay, shale, sand, grit, oil sand tailings, metal oxides etc. admixed with water.

In some cases the waste material such as mine tailings can be conveniently disposed of in an underground mine to form backfill. Generally backfill waste comprises a high proportion of coarse large sized particles together with other smaller sized particles and is pumped into the mine as slurry, occasionally with the addition of a pozzolan, where it is allowed to dewater leaving the sedimented solids in place. It is common practice to use flocculants to assist this process by flocculating the fine material to increase the rate of sedimentation. However, in this instance, the coarse material will normally sediment at a faster rate than the flocculated fines, resulting in a heterogeneous deposit of coarse and fine solids.

For other applications it may not be possible to dispose of the waste in a mine. In these instances it is common practice to dispose of this material by pumping the aqueous slurry to lagoons, heaps or stacks and allowing it to dewater gradually through the actions of sedimentation, drainage and evaporation. In these instances it is common practice to dispose of this material above ground, or into open mine voids, or even purpose built dams or containment areas. This initial placement of the mining waste into the disposal area may be as a free flowing liquid, thickened paste or the material may be further treated to remove much of the water, allowing it to be stacked and handled as a solid like material. The mining waste is allowed to further dewater gradually through the actions of sedimentation, drainage and evaporation.

For example, in the case whereby the tailings are sent to the disposal area in a liquid and fluid form, it must be contained in a lagoon by dams or similar impoundment structures. The tailings may have been pre-treated by adding flocculating agents and thickened in a gravity thickener to remove and recover some of the water content, but the overall solids content is such that fluid has no, or a low yield stress, and hence the material behaves largely as a liquid on deposition. These lagoons may be relatively shallow, or very deep, depending upon how much land is available, the method for building the impoundment area and other geotechnical factors within the vicinity of the mine site. Dependent upon the nature of the solid particles in the waste, often the particles will gradually settle from the aqueous slurry and form a compact bed at the bottom of the deposition area. Released water may be recovered by pumping or is lost to the atmosphere through evaporation, and to groundwater through drainage. It is desirable to remove the aqueous phase from the tailings whereby its gravimetric water content is closer to the liquid limit of the tailings solids, in order to manage the remaining tailings that have a predominantly solid or semi-solid handling characteristics. Numerous methods can be employed to achieve this, the most common, when the material properties of the tailings allows, is self-weight consolidation in a tailings dam, whereby the permeability of tailings is sufficient enough to overcome the filling rate of the dam and water can be freely released from the tailings. Where the permeability of the tailings is not sufficient for water to escape freely, polymers are typically used to improve permeability thereby making the tailings suitable for a self-weight consolidation process. Eventually it may be possible to rehabilitate the land containing the dewatered solids when they are sufficient dry and compact. However, in other cases, the nature of the waste solids will be such that the particles are too fine to settle completely into a compacted bed, and although the slurry will thicken and become more concentrated over time, it will reach a stable equilibrium where by the material is viscous but still fluid, making the land very difficult to rehabilitate. It is known that flocculants are sometimes used to treat the tailings before depositing them into the disposal area, in order to increase the sedimentation rate and increase the release of water for recovery or evaporation.

In an alternative method of disposal, the tailings may be additionally thickened, often by the treatment with polymeric agents, such that the yield stress of the material increased so that the slurry forms heaps or stacks when it is pumped into the disposition area. Specialised thickening devices such as Paste Thickeners or Deep Cone Thickeners may be used to produce an underflow with the required properties. Alternatively, polymeric agents may be added to the tailings slurry during transfer or discharge into the disposal area, in order to rigidify the material and achieved the required yield stress. This heaped geometry aids more rapid dewatering and drying of the material to a solid like consistency as the water is removed and recovered more rapidly through run-off and drainage, and the compaction of the solids may occur more rapidly through the increased weight and pressure of the solids when formed into a heap or a stack. In some instances, the deposition of the solids is controlled to build up relatively narrow bands of tailings, which can also dewater quickly through evaporation, prior to adding a new layer of treated waste material on top. This method has been widely used to dispose of red mud tailings from alumina processing for a number of years. Air drying of tailings can be used to great effect where the environment has some evaporation potential and there is enough area to spread the tailings thinly enough for this process to be effective. Where the area for evaporation is limited, it is possible for polymers to be added to the tailings in order to improve this process. The addition of the polymer is able to increase the permeability of the tailings whereby typically ~20% by weight of the water can be allowed to drain, while another 20% of the water that is typically more associated with the particle surface and the clay matrix can be removed through evaporation.

It is often useful for the tailings pond or dam to be of limited size in order to minimise the impact on the environment. In addition, providing larger tailings ponds can be expensive due to the high costs of earth moving and the building of containment walls. These ponds tend to have a gently sloping bottom which allows any water released from the solids to collect in one area and which can then be pumped back to the plant. A problem that frequently occurs is when the size of the tailings pond or dam is not large enough to cope with the output of tailings from the mineral processing operation. Another problem that frequently occurs is when fine particles of solids are carried away with the run-off water, thus contaminating the water and having a detrimental impact on subsequent uses of the water.

Another method for disposal of the mine tailings is to use mechanical dewatering devices such as filters and centrifuges, in order to remove a significant amount of the water from the aqueous mineral slurry, such that the waste material may be deposited in the disposal area directly with a solids like consistency. In many cases, it is necessary to treat the tailings with polymeric flocculating agents immediately prior to the mechanical dewatering step, to enable this equipment to perform efficiently and achieve the degree of dewatering required.

A further method for disposal of the mine waste is through filtration in a Geotube® whereby the aqueous slurry is pumped into a permeable geotextile bag which retains the solids particles and some of the water is release through a filtration process, escaping through the walls of the geotextile bag. In some cases, where the starting permeability of the mine tailings is low, it may be desirable to add a flocculating agent in order to increase the filtration rate, and improve the retention of fine solid particles within the Geotube®.

For example in oil sands processing, the ore is processed to recover the hydrocarbon fraction, and the remainder, including both process material and the gangue, constitutes the tailings that are to be disposed of. In oil sands processing, the main process material is water, and the gangue is mostly sand with some silt and clay. Physically, the tailings consist of a solid part (sand tailings) and a more or less fluid part (sludge). The most satisfactory place to dispose of these tailings is, of course, in the existing excavated hole in the ground. It turns out, however, that the sand tailings alone from the one cubic foot of ore occupy just about one cubic foot. The amount of sludge is variable, depending on ore quality and process conditions, but average about 0.3 cubic feet. The tailings simply will not fit back into the hole in the ground.

In a typical mineral or oil sands processing operation, waste solids are separated from solids that contain mineral values in an aqueous process. The aqueous suspensions of waste solids often contain clays and other minerals, and are usually referred to as tailings. These solids are often concentrated by a flocculation process in a gravity thickener to give a higher density underflow and to recover some of the process water. It is usual to pump the underflow to a surface holding area, often referred to as a tailings pit or dam or more usually a tailings pond in the case of oil sands. Once deposited at this surface holding area, water will continue to be released from the aqueous suspension resulting in further concentration of the solids over a period of time, as described in the paragraphs above. Once a sufficient volume of water has been collected this is usually pumped back to the mineral or oil sands processing plant.

Within the oilsands industry, there are a number of different types of process tailings streams which may require treatment with polymeric agents. One example is "fine fluid tailings" (FFT) which is the fines fraction (mainly silt and clay) from the process after the hydrocarbon content has been recovered, and the sand fraction has been largely removed, usually by passing the "whole tailings" (WT) through a cyclone. The solids content of fine fluid tailings may vary significantly, depending upon whether or not the material has been thickened by gravity sedimentation.

Another example is "combined tails" (CT) in which all the particle size ranges are present (sand, silt and clay). This may be the whole tailings, prior to the removal of the sand, or other tailings streams which may be formed by subsequent mixing of fine tailings with sand fractions, to varying degrees. A further example is "mature fine tailings" (MFT) which are formed after storage of fluid fine tailings, or in some cases combined tailings, in a tailings pond for several years.

In an oil sands tailings pond, the process water, unrecovered hydrocarbons and minerals settle naturally to form different strata. The upper stratum can be predominantly water that maybe recycled as process water to the extraction process. The lower stratum can contain settled residual hydrocarbon and minerals which are predominantly fines, usually clay. It is usual to refer to this lower stratum as mature fine tailings. It is known that mature fine tailings consolidate extremely slowly and may take many hundreds of years to settle into a consolidated solid mass. Consequently mature fine tailings and the ponds containing them are a major challenge to tailings management and the mining industry.

The composition of mature fine tailings tends to be variable. The upper part of the stratum may have a mineral content of about 10% by weight but at the bottom of the stratum the mineral content may be as high as 50% by weight. The variation in the solids content is believed to be as a result of the slow settling of the solids and consolidation occurring over time. The average mineral content of the MFT tends to be of about 30% by weight. MFT behaviour is typically dominated by clay behaviour, with the solids portion of the MFT behaving more as a plastic type material than that of a coarser, more friable sand.

The MFT generally comprises a mixture of sand, fines and clay. Generally the sand may refer to siliceous particles of a size greater than 44 µm and may be present in the MFT in an amount of up to 15% by weight. The remainder of the mineral content of the MFT tends to be made up of a mixture of clay and fines. Generally the fines refer to mineral particles no greater than 44 µm. The clay may be any material traditionally referred to as clays by virtue of its mineralogy and will generally have a particle size of below 2 µm. Typically, the clays tend to be a blend of kaolin, illite, chlorite and water swelling clays, such as montmorillonites. Additional variations in the composition of MFT maybe as a result of the residual hydrocarbon which may be dispersed in the mineral or may segregate into mat layers of hydrocarbon. The MFT in a pond not only has a wide variation of compositions distributed from top to bottom of the pond but there may also be pockets of different compositions at random locations throughout the pond.

In all cases, in addition to mineral based particulate material, it is usual for tailings from the oilsands mining operation to also contain some residual bitumen (hydrocarbon) material as it is not possible to completely recover all of the hydrocarbon from the mined raw ore feed to the plant.

It has been known to treat aqueous slurries such as tailings through the use of polymer flocculants. See, for example, any of:
EP-A-388108;
WO 96/05146;
WO 01/92167;
WO 04/060819;

WO 01/05712; and
WO 97/06111.

Canadian patent 2,803,904 [Sortwell (Sortwell #1)] teaches the use of high molecular weight multivalent anionic polymers for clay aggregation. Specifically, Sortwell #1 purports to relate to a polymer comprising an anionic water-soluble multivalent cation-containing acrylate copolymer. Example 1 of Sortwell #1 provides the reagents and methodology used to produce a linear calcium diacrylate copolymer with an intrinsic viscosity of 18 dl/gm. We attempted to reproduce this polymer but were unable to synthesize it at the stated intrinsic viscosity and with a residual monomer content of less than a 1000 ppm. Rather, (i) we could not measure the intrinsic viscosity as the product was very insoluble, and (ii) the product that was produced had significantly high residual monomer content that would create an occupational health risk in an industrial setting.

Canadian patent 2,803,025 [Sortwell (Sortwell #2)] teaches a polymer similar to the polymer taught in Sortwell #1 with the proviso that Sortwell #2 is focussed on such a polymer with intrinsic viscosity of less than 5 dl/gm. Our attempts to reproduce this polymer met with the same problem as in Sortwell #1 with regard to the residual monomer content and furthermore the polymer we produced had an intrinsic viscosity of 7-10 dl/gm instead of less than 5 dl/gm as stated in Sortwell #2.

Thus, despite the advances made in the art, there is a need for a multivalent cation containing copolymer derived from one or more ethylenically unsaturated acids having a desirable balance of properties and a residual comonomer content of less than 1000 ppm.

SUMMARY OF THE INVENTION

It is an object of the present invention to obviate or mitigate at least one of the above-mentioned disadvantages of the prior art.

It is another object of the present invention to provide a novel multivalent cation containing copolymer derived from one or more ethylenically unsaturated acids.

Accordingly, in one of its aspects, the present invention provides a multivalent cation containing copolymer derived from one or more ethylenically unsaturated acids, the copolymer having the following characteristics:

(a) an intrinsic viscosity of at least about 3 dl/g when measured in 1 M NaCl solution at 25° C.;
(b) the copolymer is derived from a monomer mixture comprising an ethylenically unsaturated acid and at least one comonomer, the ethylenically unsaturated acid present in an amount in the range of from about 5% to about 65% by weight; and
(c) a residual comonomer content is less than 1000 ppm when the comonomer is an acrylamide.

The term "multivalent cation containing copolymer" as used throughout this specification is intended to mean that the multivalent cation is contained as part of the copolymer. Typically the multivalent cation would be a salt of the copolymer (e.g., the "calcium copolymer" would be the calcium salt of the copolymer). This is quite different from a blend of a copolymer and a further compound of a multivalent cation because in such a blend the copolymer and the multivalent compound these two components are physically distinct entities and hence in such a blend the copolymer does not contain the multivalent cation.

The multivalent cation is contained in the copolymer in a significant amount relative to the amount of repeating monomer acid units of the copolymer derived from the ethylenically unsaturated acid. Typically, the molar equivalent of multivalent cation to repeating monomer acid units is at least 0.10:1. Suitably the molar ratio equivalent may be from 0.15:1 to 1.6:1, normally from 0.20:1 to 1.2:1, preferably from 0.25:1 to 1:1.

The reference to ethylenically unsaturated acid or acids means any ethylenically unsaturated monomer which bears an acid group or an acid radical group which is in ionic association with the multivalent cation. Typically this will be an ethylenically unsaturated acid which is at least partly neutralised by the multivalent cation. Typical examples of ethylenically unsaturated acids include alkaline earth metal or other multivalent metal salts of acrylic acid and methacrylic acid, for instance calcium diacrylate or magnesium diacrylate.

The multivalent cation containing copolymer is therefore obtainable by copolymerisation of the ethylenically unsaturated acid which is already in association with the multivalent cation, for instance multivalent cation salts of the ethylenically unsaturated acid, with the comonomer.

The multivalent cation containing copolymer may also contain a proportion of monovalent cations, such as sodium, potassium or ammonium ions. Where present such monovalent cations would be in addition to the multivalent cation. In general the monovalent cations will be present in a molar amount which is no more than the molar equivalent amount of the multivalent cation relative to the amount of the aforementioned repeating monomer acid units of the copolymer.

The term "an acrylamide", as used throughout this specification, is intended to mean acrylamide, methacrylamide or an N-substituted acrylamide, such as N-methylacrylamide. Preferably, however, the term "an acrylamide" means either acrylamide or methacrylamide and more preferably it means acrylamide.

The term "about", as used throughout this specification, is intended to mean an interval of accuracy that the person skilled in the art will understand to still ensure the technical effect of the feature in question. The term typically indicates deviation from the indicated numerical value of ±10%, and preferably of ±5%.

The present multivalent cation containing copolymer is derived from a monomer mixture comprising an ethylenically unsaturated acid and at least one comonomer, the ethylenically unsaturated acid present in an amount in the range of from about 5% to about 65% by weight. Preferably, polymerization is effected by reacting the monomer mixture using redox initiators and/or thermal initiators. Typically redox initiators include a reducing agent such as sodium sulphite, sodium metabisulphite, sulphur dioxide and an oxidising compound such as ammonium persulphate or a suitable peroxy compound, such as tertiary butyl hydroperoxide etc. Redox initiation may employ up to 10,000 ppm (based on weight of aqueous monomer) of each component of the redox couple. Preferably though each component of the redox couple is often less than 1000 ppm, typically in the range 1 to 100 ppm, normally in the range 4 to 50 ppm. The ratio of reducing agent to oxidizing agent may be from 10:1 to 1:10, preferably in the range 5:1 to 1:5, more preferably 2:1 to 1:2, for instance around 1:1.

The polymerization of the monomer mixture is preferably conducted by employing a thermal initiator alone or in combination with other initiator systems, for instance redox initiators. Thermal initiators would include any suitable initiator compound that releases radicals at an elevated temperature, for instance azo compounds, such as azobisisobutyronitrile (AIBN), 4,4'-azobis-(4-cyanovalereic acid) (ACVA). Typically thermal initiators are used in an amount of up to 10,000 ppm, based on weight of aqueous monomer. In most cases, however, thermal initiators are used in the range 100 to 5,000 ppm preferably 200 to 2,000 ppm, more preferably 300 to 700 ppm, usually around 400 to 600 ppm, based on the weight of the aqueous monomer mixture.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

The present invention relates to a multivalent cation containing copolymer derived from one or more ethylenically unsaturated acids, the copolymer having the following characteristics: (a) an intrinsic viscosity of at least about 3 dl/g when measured in 1 M NaCl solution at 25° C.; (b) the copolymer is derived from a monomer mixture comprising an ethylenically unsaturated acid and at least one comonomer, the ethylenically unsaturated acid present in an amount in the range of from about 5% to about 65% by weight; and (c) a residual comonomer content is less than 1000 ppm when the comonomer is an acrylamide. Preferred embodiments of this copolymer may include any one or a combination of any two or more of any of the following features:

the copolymer is in the form of a calcium copolymer (by "calcium copolymer" is meant the aforementioned copolymer in which the multivalent cation is calcium—this may be termed the calcium salt of the copolymer—in this case the calcium cation may partially or fully neutralise the acid groups of the copolymer);

the copolymer is in the form of a magnesium copolymer (by "magnesium copolymer" is meant the aforementioned copolymer in which the multivalent cation is magnesium—this may be termed the magnesium salt of the copolymer—in this case the magnesium cation may partially or fully neutralise the acid groups of the copolymer);

the at least one comonomer is selected from the group consisting of acrylamide, methacrylamide and any mixture thereof;

the at least one comonomer is acrylamide;

the ethylenically unsaturated acid is selected from the group consisting of acrylic acid, methacrylic acid, itaconic acid, crotonic acid, fumaric acid, acrylamido tertiary butyl sulfonic acid (ATBS) and any mixture of two or more of these;

the ethylenically unsaturated acid is selected from the group consisting of acrylic acid, methacrylic acid, acrylamido tertiary butyl sulfonic acid (ATBS) and any mixture of two or more of these;

the ethylenically unsaturated acid is acrylic acid;

the ethylenically unsaturated acid present in an amount in the range of from about 15% to about 65% by weight;

the ethylenically unsaturated acid present in an amount in the range of from about 20% to about 65% by weight;

the ethylenically unsaturated acid present in an amount in the range of from about 35% to about 65% by weight;

the instrinsic viscosity in the range of from about 4 to about 25 dl/g when measured in 1 M NaCl solution at 25° C.;

the instrinsic viscosity in the range of from about 4 to about 20 dl/g when measured in 1 M NaCl solution at 25° C.;

the instrinsic viscosity in the range of from about 5 to about 15 dl/g when measured in 1 M NaCl solution at 25° C.;

the copolymer is in solid form;

the copolymer is in particulate form;

the copolymer is in spherical particulate form;

the copolymer is in powder form;

the copolymer is in bead form;

the copolymer is in the form of a reverse-phase emulsion;

the copolymer is in the form of a reverse-phase dispersion;

the copolymer is in the form of an aqueous solution;

the copolymer is in the form of an aqueous dispersion;

the copolymer is linear;

the copolymer is branched;

the copolymer is cross-linked;

the residual comonomer (ACM) content is less than about 500 ppm when the comonomer is an acrylamide;

the residual comonomer (ACM) content is in the range of from about 300 pmm to about 500 ppm when the comonomer is an acrylamide;

the copolymer is water soluble;

the copolymer is in substantially pure form;

the copolymer is in isolated form;

the copolymer has an anionic content in the range of from about 20 to about 65% by weight;

the copolymer has an anionic content in the range of from about 25 to about 65% by weight;

the copolymer has an anionic content in the range of from about 30 to about 65% by weight; and/or the copolymer has an anionic content in the range of from about 40 to about 60% by weight.

In one preferred form, the multivalent cation containing copolymer of the present invention is water soluble. By water soluble we mean that the copolymer has a gel content measurement of less than 50% gel. The gel content measurement is described below.

Preferably, the present multivalent cation containing copolymer is used in a process to treat an aqueous slurry comprising particulate material. The term "treat" is intended to have a broad meaning and includes thickening, sedimentation, dewatering, compaction, consolidation, coagulation, flocculation and the like. Preferred embodiments of this process may include any one or a combination of any two or more of any of the following features:

the process comprises the step of contacting the aqueous slurry with the above multivalent cation containing copolymer;

the process comprises the step of contacting the aqueous slurry with an aqueous solution comprising the above multivalent cation containing copolymer;

the aqueous slurry comprises tailings;

the aqueous slurry comprises mature fine tailings (MFT);

the aqueous slurry comprises fluid fine tailings (FFT);

the aqueous slurry comprises thin fine tailings (TFT);

the aqueous slurry comprises whole fine tailings (WT);

the process results in the thickening of the solid particulates;

the process results in the sedimentation of the solid particulates;

the process results in the dewatering of the solid particulates;

the process results in the compaction and/or consolidation of the solid particulates;

the process results in the coagulation of the solid particulates; and/or the process results in the flocculation of the solid particulates.

Preferred embodiments of the present application will be described with reference to the following Examples which should not be used to construe or limit the scope of the invention.

EXAMPLES

In the Examples, the following materials were used.
Monomers:

Acrylamide (ACM)

Calcium acrylate $((Ca)_{0.5}AA)$

Magnesium acrylate $((Mg)_{0.5}AA)$

For all calculations $(Ca)_{0.5}AA$ (short Ca-AA) was used instead of $Ca(AA)_2$ and $(Mg)_{0.5}AA$ (short Mg-AA) was used instead of $Mg(AA)_2$.
Chemicals:

| | |
|---|---|
| ACM | Acrylamide |
| Ca-AA | Calcium acrylate [$(Ca)_{0.5}AA$] |
| Mg-AA | Magnesium acrylate [$(Mg)_{0.5}AA$] |
| Na-AA | Sodium acrylate [Na AA] |
| Na-hypophosphite | sodium hypophosphite |
| | sodium metabisulphite |
| tBHP | tert-Butyl hydroperoxide |
| AIBN | Azobisisobutyronitrile |
| ACVA | 4,4' Azobis (4-cyano valeric acid) |
| Trilon™ C | Diethylene triamino pentaacetate |

The polymers were subject to various tests using the following methodology.
Determination of Solid Content Approximately 1 g of polymer is weighed into an aluminium pan and put into the drying oven for 3 hours at 110° C. The mass difference before drying and after drying is determined and the solid content of the polymer is calculated in percent. This procedure is repeated twice and the average value of all three measurements is calculated.

IV (Intrinsic Viscosity) Measurement, Visual Solubility Evaluation, and Gel Content Determination Including Solution Preparation
Preparation of Stock Solution:

1.0 g of polymer is weight in a bottle and 199 ml of deionised water are added. This mixture is mixed for 4 hours on a tumble wheel at ambient temperature (25° C.).

Visual Solubility Evaluation:

The solubility of this stock solution is evaluated visually in terms of potential undissolved polymer particles or gel particles in the solution.

Gel Content Determination:

The gel content is determined by filtering the stock solution (preparation see above) through a sieve with a 190 µm mesh size. The residue which stays in the filter is washed, recovered, dried (110° C.) and weighed, and the percentage of undissolved polymer is calculated (weight of dry residue from the filter [g]/weight of dry polymer before filtration [g]). Where necessary, this provides a quantifiable confirmation of the visual solubility evaluation.

Preparation of Diluted Measuring Solutions for IV Measurements:

4.0, 8.0, 12.0, and 16.0 g, respectively, of the stock solution (preparation see above) are weighed into 100 ml volumetric flasks. 50 ml of sodium chloride solution (2 M) is added by pipette and the flask is then filled to the 100 ml mark with dionized water and this mixture is shaken for 5 minutes until homogeneous.

IV-Measurement:

The polymer solutions are transferred to an Ubbelohde viscometer and the IV is measured. The measurement carried out at 25° C. at the capillary viscometer Lauda iVisc.

Residual Acrylamide Determination
Chemicals:

Acrylamide (Standard, purity >99.5%);
water, deionized;
orthophosphoric acid (85%);
isopropanol; and
methanol (HPLC-quality).

Chromatographic Conditions:

| | |
|---|---|
| machine | high-pressure liquid chromatographs with variable UV-detectors, Waters 2695 and 2487 |
| column | Machery-Nagel Nucleosil 100-5 $C_{18}$, 250 × 4.6 mm |
| column size | 250 mm × 4.6 mm |
| mobile phase | 50 ppm orthophosphoric acid in water/methanol (94/6 vol-%) |
| flow rate | 0.8 mL/min |
| temperature of column | room temperature |
| detection | UV = 210 nm |
| injection volume | 5 µL |

Preparation of Standard Acrylamide Solutions:

20.0 mg of acrylamide was weighed into a 100 ml volumetric flask. Subsequently a mixture of isopropanol and water (70/30) was added to the 100 ml mark. Out of this stock solution, several measurement solutions were prepared by means of a dilution series (e.g., 0.2 mL/50 mL, 1/50 mL, 5/50 mL 10/50 mL and 15 mL/50 mL).

Sample Preparation:

1.00 g of polymer was weight in a 100 mL glass bottle and 50 mL of a mixture of isopropanol and water (70/30) were added and stirred for 2 hours. This mixture was filtered (nylon filter with pore size: 0.45 µm) and placed in a HPLC-vial.

Measurement:

The HPLC measurements are done by high-pressure liquid chromatographs with variable UV detectors, Waters 2695 and 2487. The signals of the standard acrylamide solutions were utilized to prepare a calibration curve with the software "Empower". By means of the calibration curve the residual acrylamide value in the samples is calculated Example 1—40 wt % Ca Diacrylate Polymer
(IV=15)

Water (1092.6 g) and glacial acrylic acid (286.3 g) are added to a reaction vessel. Next, 30 wt % aqueous suspension of Ca(OH)$_2$ (~477 g) is added to this mixture slowly under cooling and pH control until pH 6.0±0.1 is reached. 51 wt % aqueous solution of Acrylamide (1085.6 g), Trilon™ C (4.6 g), defoamer (Xiameter™ AFE-0400), 10 wt % aqueous solution of Na-hypophosphite (0.45 g), and 4% ACVA in 5 wt % NaOH solution (22.5 g) are added and the pH is again adjusted with acetic acid to pH 6.0±0.1.

Next, the additional water is added to reach the monomer solids of 30.5% (for calculation ACM, Ca-AA, and unneutralised AA are taken into account). The reaction mixture is cooled down during degassing for 45 minutes. When a temperature of about −1° C. is reached, 4% AIBN solution in methanol (22.5 g) and 1% aqueous solution of tBHP (1.5 g) solutions are added to the monomer solution and the degassing is continued for 10 minutes.

Subsequently, at a temperature of 0° C.±1.0° C., the polymerization is initiated by adding the 1% aqueous solution of sodium metabisulphite solution (3.0 g). After the polymerization, the wet gel was placed in a heated cabinet at 80° C. for 2 hours. Next, the wet gel is minced, subsequently dried in a fluid bed dryer (65° C. for 2 hours), and finally ground to obtain a white/yellowish powder.

The polymer had the following characteristics:
IV: 15 dl/g
Gel content: 3%
Visual solubility: good
Solid content: 89%
Residual acrylamide: 400 ppm Example 2—40 wt % Ca Diacrylate Polymer
(IV=5)

Water (135.2 g) and glacial acrylic acid (38 g) are added to a reaction vessel. Next, 30 wt % aqueous suspension of Ca(OH)$_2$ (~67 g) is added to this mixture slowly under cooling and pH control until pH 6.0±0.1 is reached. 51 wt % aqueous solution of Acrylamide (144 g), 5 wt % aqueous solution of Trilon™ C (2.9 g), defoamer (Xiameter™ AFE-0400), 10 wt % aqueous solution of Na-hypophosphite (0.6 g), and 4% ACVA in 5 wt % NaOH solution (3 g) are added and the pH is again adjusted with acetic acid to pH 6.0±0.1.

Next, the additional water is added to reach the monomer solids of 30.5% (for calculation ACM, Ca-AA, and unneutralised AA are taken into account). The reaction mixture is cooled down during degassing for 45 minutes. When a temperature of about −1° C. is reached, 4% AIBN solution in methanol (3 g) and 1% aqueous solution of tBHP (0.32 g) are added to the monomer solution and the degassing is continued for 2 minutes.

Subsequently, at a temperature of 0° C.±1.0° C., the polymerization is initiated by adding the 1% aqueous solution of sodium metabisulphite solution (0.64 g). After the polymerization, the wet gel was placed in a heated cabinet at 80° C. for 2 hours. Next, the wet gel is minced, subsequently dried in a fluid bed dryer (65° C. for 2 hours), and finally ground to obtain a white/yellowish powder.

The polymer had the following characteristics:
IV: 5.7 dl/g
Gel content: not determined
Visual solubility: good
Solid content: 81.6%
Residual acrylamide: 259 ppm Example 3—40 wt % Ca Diacrylate Polymer
(IV=11)

Water (135 g) and glacial acrylic acid (38 g) are added to a reaction vessel. Next, 30 wt % aqueous suspension of Ca(OH)$_2$ (~66 g) is added to this mixture slowly under cooling and pH control until pH 6.0±0.1 is reached. 51 wt % aqueous solution of Acrylamide (144 g), 5 wt % aqueous solution of Trilon™ C (2.9 g), defoamer (Xiameter™ AFE-0400), 10 wt % aqueous solution of Na-hypophosphite (1.4 g), and 4% ACVA in 5 wt % NaOH solution (3 g) are added and the pH is again adjusted with acetic acid to pH 6.0±0.1.

Next, the additional water is added to reach the monomer solids of 30.5% (for calculation ACM, Ca-AA, and unneutralised AA are taken into account). The reaction mixture is cooled down during degassing for 45 minutes. When a temperature of about −1° C. is reached, 4% AIBN solution in methanol (3 g) and 1% aqueous solution of tBHP (0.2 g) are added to the monomer solution and the degassing is continued for 2 minutes.

Subsequently, at a temperature of 0° C.±1.0° C., the polymerization is initiated by adding the 1% aqueous solution of sodium metabisulphite solution (0.40 g). After the polymerization, the wet gel was placed in a heated cabinet at 80° C. for 2 hours. Next, the wet gel is minced, subsequently dried in a fluid bed dryer (65° C. for 2 hours), and finally ground to obtain a white/yellowish powder.

The polymer had the following characteristics:
IV: 10.8 dl/g
Gel content: not determined
Visual solubility: good
Solid content: 86.9%
Residual acrylamide: 240 ppm Example 4—40 wt % Ca Diacrylate Polymer Beads
(IV=3)

600 g solvent oil D40, 5.0 g Span™ 80, and 1.4 g phenothiazine were weighed into a 2 L double wall reactor and the reactor was heated to 35° C. whilst purging with nitrogen for 90 minutes.

The aqueous monomer phase was prepared in a separate beaker. Specifically, 80 g water and 40.7 g glacial acrylic acid was weighed into the beaker and approximately 71.5 g calcium hydroxide (30 wt % aqueous suspension) was added dropwise with cooling to neutralize the acrylic acid until a pH 6.0 is reached. Next, 154.3 g acrylamide (51 wt % aqueous solution), 0.6 g Trilon™ C, and 0.9 g sodium hypophosphite (10 wt % aqueous solution) was added to the mixture. The pH is re-adjusted to 6.0 and the additional water (4.2 g) was added to reach a solid content of 35.7%. In addition, 1.44 g V-50™ (10% aqueous solution) and 2.88 g sodium sulfite (1% aqueous solution) were added into the monomer phase.

The aqueous monomer phase and the oil phase were combined in the double wall reactor and the stirring speed was adjusted to 350 rpm. To start the reaction 5.76 g tBHP (1% aqueous solution) was added. After reaching the temperature maximum, the mixture was stirred further for 30 min. The water was removed by an azeotropic distillation at 75° C. and 50 mPa. The reaction mixture was cooled down to 30° C., removed from the reactor and the polymer beads were filtered out of the oily reaction mixture, washed with acetone and dried in the drying oven at 40° C. for 6 hours, obtaining dry polymer beads.

The polymer had the following characteristics:
IV: 2.9 dl/g
Gel content: not determined
Visual solubility: good
Solid content: 84.1%
Residual acrylamide: not determined Example 5—60 wt % Ca Diacrylate Polymer (IV=5)

Water (135 g) and glacial acrylic acid (57 g) are added to a reaction vessel. Next, 30 wt % aqueous suspension of $Ca(OH)_2$ (~100 g) is added to this mixture slowly under cooling and pH control until pH 6.0±0.1 is reached. 51 wt % aqueous solution of Acrylamide (96 g), 5 wt % aqueous solution of Trilon™ C (2.9 g), defoamer (Xiameter™ AFE-0400), 10 wt % aqueous solution of Na-hypophosphite (0.5 g), and 4% ACVA in 5 wt % NaOH solution (3 g) are added and the pH is again adjusted with acetic acid to pH 6.0±0.1.

Next, the additional water is added to reach the monomer solids of 30.5% (for calculation ACM, Ca-AA, and unneutralised AA are taken into account). The reaction mixture is cooled down during degassing for 45 minutes. When a temperature of about −1° C. is reached, 4% AIBN solution in methanol (3 g) and 1% aqueous solution of tBHP (0.2 g) are added to the monomer solution and the degassing is continued for 2 minutes.

Next, at a temperature of 0° C.±1.0° C., the polymerization is initiated by adding the 1% aqueous solution of sodium metabisulphite solution (0.40 g). After the polymerization, the wet gel was placed in a heated cabinet at 80° C. for 2 hours. Next, the wet gel is minced, subsequently dried in a fluid bed dryer (65° C. for 2 hours), and finally ground to obtain a white/yellowish powder.

The polymer had the following characteristics:
IV: 4.4 dl/g
Gel content: not determined
Visual solubility: good
Solid content: 84.3%
Residual acrylamide: 80 ppm Example 6—60 wt % Ca Diacrylate Polymer (IV=11)

Water (135 g) and glacial acrylic acid (57 g) are added to a reaction vessel. Next, 30 wt % aqueous suspension of $Ca(OH)_2$ (~99 g) is added to this mixture slowly under cooling and pH control until pH 6.0±0.1 is reached. 51 wt % aqueous solution of Acrylamide (96 g), 5 wt % aqueous solution of Trilon™ C (2.9 g), defoamer (Xiameter™ AFE-0400), 10 wt % aqueous solution of Na-hypophosphite (0.8 g), and 4% ACVA in 5 wt % NaOH solution (3 g) are added and the pH is again adjusted with acetic acid to pH 6.0±0.1.

Next, the additional water is added to reach the monomer solids of 30.5% (for calculation ACM, Ca-AA, and unneutralised AA are taken into account). The reaction mixture is cooled down during degassing for 45 minutes. When a temperature of about −1° C. is reached, 4% AIBN solution in methanol (3 g) and 1% aqueous solution of tBHP (0.2 g) are added to the monomer solution and the degassing is continued for 2 minutes.

Next, at a temperature of 0° C.±1.0° C., the polymerization is initiated by adding the 1% aqueous solution of sodium metabisulphite solution (0.40 g). After the polymerization, the wet gel was placed in a heated cabinet at 80° C. for 2 hours. Next, the wet gel is minced, subsequently dried in a fluid bed dryer (65° C. for 2 hours), and finally ground to obtain a white/yellowish powder.

The polymer had the following characteristics:
IV: 11.7 dl/g
Gel content: not determined
Visual solubility: good
Solid content: 87.4%
Residual acrylamide: 160 ppm Example 7

The polymers produced in Examples 1-6 were tested as flocculants in the treatment and dewatering of a slurry of mature fine tailings (MFT) from an oil sands mining operation. The MFT sample used had a total solids content of 33% and overall clay content of 26%.

The following protocol was used during the testing.

Each of the polymers were prepared as 0.5% wt/vol solutions in process water from the oil sands mining operation. Typically this water has a similar chemical composition to the aqueous phase of the MFT slurry.

Prior to testing, the sample of MFT slurry should be mixed under high shear conditions to breakdown any thixotropic gel structure which may have formed in the sample. The correct amount of mixing required to achieve this may be determined by monitoring the yield shear stress of the material, and sufficient mixing should be given until the yield stress value is minimised and stable.

A 300 g aliquot of the MFT slurry is placed in a 600 ml beaker and sheared at 500 rpm with a flat blade impeller until minimum slurry yield stress is achieved as described above. Reduce the mixer speed to 320 rpm and immediately add the required amount of flocculant solution to the MFT slurry. Mixing is continued until the sample is conditioned at the visual point of optimum flocculation/net water release (NWR), at which point the mixer is stopped. The time required to reach the point of optimum conditioning is recorded, and it may differ for different polymer types and dosages.

The beaker is removed from the stirrer and any remaining slurry left on the impeller is scraped off into the beaker. The yield stress of the treated material is immediately recorded using a suitable rheometer (e.g., Haake Rheometer with a vane spindle).

The treated material is transferred into a 2" slump collar, located on top of a 1 mm mesh sieve and fitted with a collection base. The beaker is scraped clean and the solids are added to those in the collar. Record the total amount of solids & water transferred from the beaker to the sieve. The slump collar is removed, and timing is started.

24 hours after the material is slumped, the volume of water released from the solids, and the yield stress of the remaining solids on the sieve is measured and recorded.

NWR (%) is calculated for each data point is calculated using the following equation:

$$NWR\ (\%) = \left[ \frac{\text{Total volume of water release (ml)} - \text{Volume of polymer solution added (ml)}}{\text{Weight of slurry used (g)} \times \left\{ 1 - \frac{\text{MFT Slurry Solids Content (\% w/w)}}{100} \right\}} \right] \times 100$$

Figure 1:
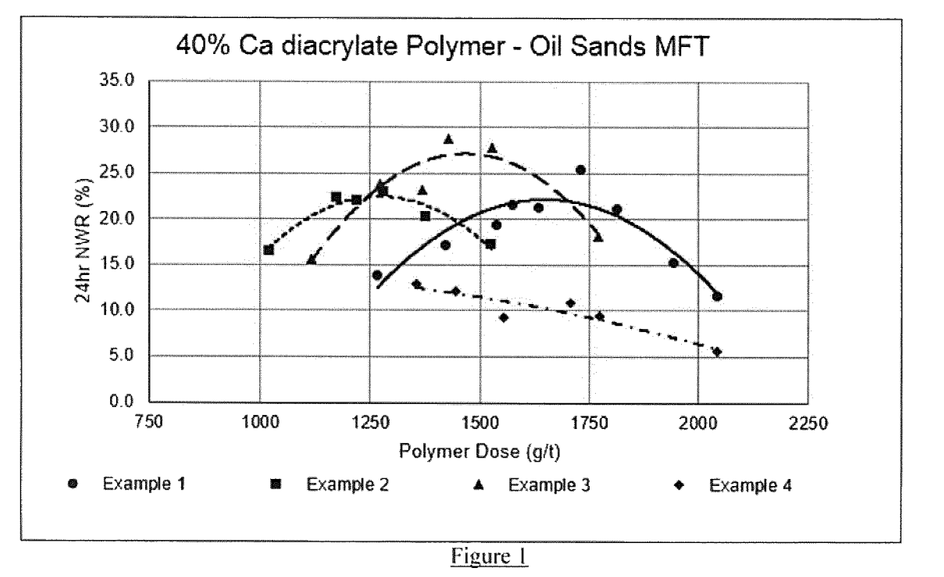
FIGS. 1-2 illustrate results of testing of polymers produced in Examples 1-6 to treat a slurry of mature fine tailings (MFT)
Figure 2:
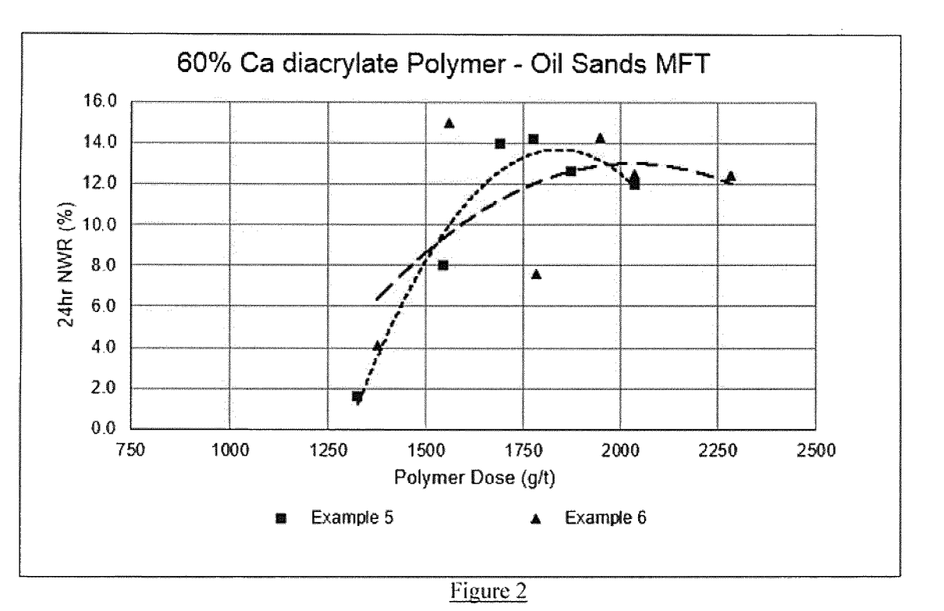

Results:

Table 1 shows the test results obtained for the 40% calcium diacrylate polymers (examples 1 to 4) and Table 2 shows the test results obtained for the 60% calcium diacrylate polymers (examples 5 and 6). The 24 hour NWR data is also represented graphically in FIGS. 1 and 2.

The results show that the calcium diacrylate polymers are able to effectively treat, flocculate and dewater the oil sands, MFT slurry.

Example 8—21% Wt Ca Diacrylate Polymer (IV=10.1)

Water (140.4 g) and glacial acrylic acid (20.3 g) are added to a reaction vessel. Next, 30 wt % aqueous suspension of $Ca(OH)_2$ (~40 g) is added to this mixture slowly under cooling and pH control until pH 6.0±0.1 is reached. 51 wt % aqueous solution of Acrylamide (188.9 g), 5 wt % aqueous solution of Trilon™ C (2.9 g), defoamer (Xiameter™ AFE-0400), 1 wt % aqueous solution of Na-hypophosphite (0.8 g), and 4% ACVA in 5 wt % NaOH solution (3 g) are added and the pH is again adjusted with acetic acid to pH 6.0±0.1.

Next, addition water is added to reach the monomer solids of 30.5% (for calculation ACM, Ca-AA, and unneutralised AA are taken into account). The reaction mixture is cooled down during degassing for 45 minutes. When a temperature of about −1° C. is reached, 4% AIBN solution in methanol (3 g) and 1% aqueous solution of tBHP (0.32 g) are added to the monomer solution and the degassing is continued for 2 minutes.

Next, at a temperature of 0° C.±1.0° C., the polymerization is initiated by adding the 1% aqueous solution of sodium metabisulphite solution (0.64 g). After the polymerization, the wet gel was placed in a heated cabinet at 80° C. for 2 hours. Next, the wet gel is minced, subsequently dried in a fluid bed dryer (55° C. for 2 hours), and finally ground to obtain a white/yellowish powder.

The polymer had the following characteristics:
IV: 10.1 dl/g
Gel content: 0%
Visual solubility: good
Solid content: 90.4%
Residual acrylamide: 570 ppm

Example 9—19.5% wt Mg Diacrylate Polymer (IV=10.2)

Water (130.7 g) and glacial acrylic acid (20.5 g) are added to a reaction vessel. Next, 20 wt % aqueous suspension of $Mg(OH)_2$ (~41.4 g) is added to this mixture slowly under cooling and pH control until pH 6.0±0.1 is reached. 51 wt % aqueous solution of Acrylamide (192 g), 5 wt % aqueous solution of Trilon™ C (3 g), defoamer (Xiameter™ AFE-0400), 1 wt % aqueous solution of Na-hypophosphite (0.8 g), and 4% ACVA in 5 wt % NaOH solution (3 g) are added and the pH is again adjusted with acetic acid to pH 6.0±0.1.

Next, addition water is added to reach the monomer solids of 30.5% (for calculation ACM, Mg-AA, and unneutralised AA are taken into account). The reaction mixture is cooled down during degassing for 45 minutes. When a temperature of about −1° C. is reached, 4% AIBN solution in methanol (3 g) and 1% aqueous solution of tBHP (0.24 g) are added to the monomer solution and the degassing is continued for 2 minutes.

Next, at a temperature of 0° C.±1.0° C., the polymerization is initiated by adding the 1% aqueous solution of sodium metabisulphite solution (0.48 g). After the polymerization, the wet gel was placed in a heated cabinet at 80° C. for 2 hours. Next, the wet gel is minced, subsequently dried in a fluid bed dryer (55° C. for 2 hours), and finally ground to obtain a white/yellowish powder.

The polymer had the following characteristics:
IV: 10.2 dl/g
Gel content: 0.3%
Visual solubility: good
Solid content: 87.2%
Residual acrylamide: 565 ppm

Example 10—Treatment of MFT from an Oilsands Mining Operation

The polymers produced in Examples 8 and 9 were tested as flocculants in the treatment and dewatering of a slurry of mature fine tailings (MFT) from an oil sands mining operation. The protocol used was that described above in Example 7.

Figure 3:
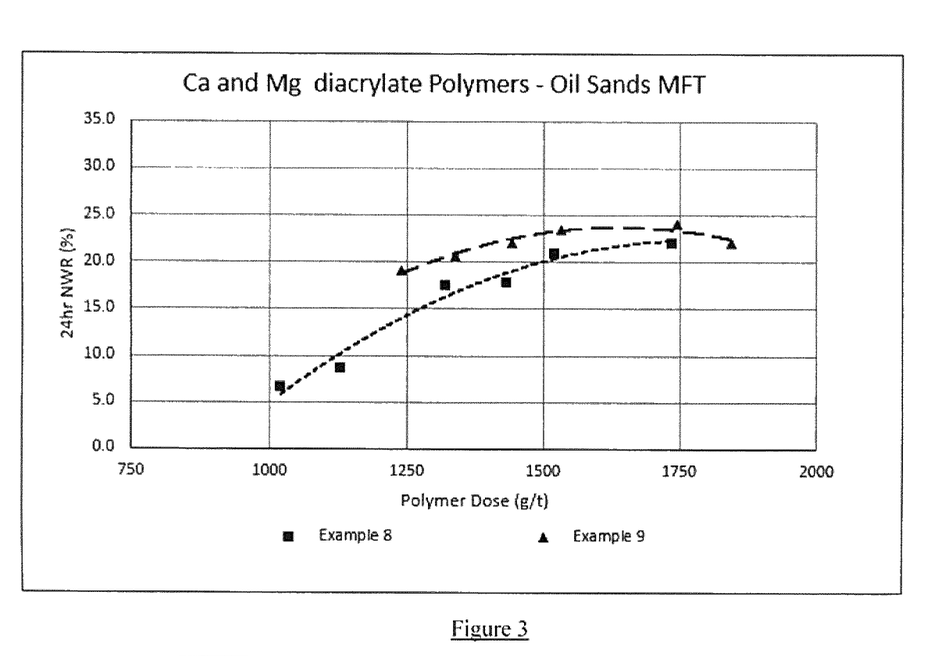
FIG. 3 illustrates results of testing of polymers produced in Examples 8 and 9 to treat a slurry of mature fine tailings (MFT)

Table 3 shows the test results obtained for the calcium and magnesium diacrylate polymers (Examples 8 and 9, respectively). The 24 hour NWR data is also represented graphically in FIG. 3.

The results show that the both the magnesium and calcium diacrylate polymers are able to effectively treat, flocculate and dewater the oil sands, MFT slurry.

Example 11—Treatment of Tailings from a Mineral Sands Mining Operation

The polymer prepared in Example 1 was tested as a flocculant in the treatment of a slurry of fine tailings (<53 μm) from a mineral sands mining operation. The tailings sample used had a total solids content of 38% wt/wt.

The following protocol was during the testing.

The polymer was prepared as 0.25% wt/vol solution in process water from the mineral sands mining operation and added to 280 ml of tailings slurry, with mixing via beaker pours to create maximum and optimal flocculation structure (visual assessment). The flocculated material was then placed into a slump collar, which was then removed, allowing the solids to slump and free water to drain from the solids. The amount of slumping was used to estimate the yield stress of the treated solids. The free water released from the treated material was collected and the volume measured after an elapsed time of 5 minutes and used to calculate the net water release, as described in Example 7 above.

The results are shown in Table 4 below.

The results show that the calcium diacrylate polymer of Example 1 is able to effectively treat, flocculate and dewater the mineral sands tailings slurry.

Example 12—Preparation of a 65 w % Ca Diacrylate Polymer (IV=4.5) According to Methodology Described in Examples of Sortwell #2 (CA 2,803,025)

In this example, the reagents and amounts used are shown in Table 5.

The Sortwell example discloses the following about a mixture of these reagents: "A rapid reaction produced a gel. The intrinsic viscosity (IV) of this polymer was 4.5 dl/gm (measured in 1 M NaCl at 25° C.)". It was noted that the instructions in Sortwell #2 do not include information in respect of how the calcium diacrylate monomer should be prepared, the starting temperature for the reaction and whether deoxygenation was employed prior to initiating the polymerization reaction. Also, Sortwell #2 indicates that the resulting polymer was used to treat oil sands MFT without further processing of the aqueous polymer gel into a dry powder, which would be considered normal and necessary for commercial supply and use of these polymers.

Attempts were made to prepare a similar polymer based on the disclosed details in Sortwell #2. With an expected exotherm of approximately 45° C. from the reaction mixture, we chose a starting temperature of approximately 9° C., as was disclosed for the preparation of the polymer in Example 13 below (as Sortwell #1).

Sample A—0.04% Trilon™ C (chelating agent) addition to the aqueous monomer solution which was then degassed with $N_2$ for 45 minutes prior to initiation.

Sample B—0.04% Trilon™ C (chelating agent) addition to the aqueous monomer solution which was then degassed with $N_2$ for 45 minutes prior to initiation. Resultant aqueous gel held at 80° C. for 2 hours after completion of the polymerization process, prior to any further processing.

Samples C, D & E—repeat preparations using the same method as sample A

Following Sortwell #2, the aqueous polymer gel was initially characterized directly and, for a more complete evaluation, we also processed part of each gel through to a dry powder product (as described in Examples 1-6, 8 and 9 above). In all cases, irrespective of whether we used the aqueous gel or dry powder, it was found that the polymer produced was poorly soluble. In general, it required approximately 15 hours to complete the dissolution process and for preparations when it was possible to adequately separate sufficient soluble polymer from the insoluble residue, it was found that the polymers had IV's in the range of 7-10 dl/g, which is substantially higher than the range claimed in Sortwell #2 (i.e., IV of less than 5 dl/gm). It was also found that all the preparations had high levels of residual acrylamide monomer such that of the gels would be classified as being hazardous materials (according to GHS criteria), which would render them unsuitable for general application for industrial water and waste treatment processes (NB: residual monomer values were recorded based upon either the total weight of the aqueous gel or total weight of dry powder, as appropriate). These test results are reported in Table 6.

This example demonstrates that Sortwell #2 provides insufficient information for the preparation of the claimed polymer and/or that the method disclosed is not viable for its production.

Example 13—Preparation of a 65 w % Ca Diacrylate Polymer (IV=18) According to Methodology Described in Examples of Sortwell #1 (CA 2,803,904)

In this example, the reagents and amounts used are shown in Table 7.

The Sortwell example states: "The pH was adjusted to 6.5 with HCl before initiation of the reaction, and the reagents were de-aerated with $N_2$ and the reaction was initiated at 9° C. and carried to completion, resulting in a linear calcium diacrylate copolymer with an intrinsic viscosity of 18 dl/gm". It was noted that the instructions in Sortwell #1 provide no information in respect of how the calcium diacrylate monomer should be prepared, duration of the degassing period or the method, and especially the solvent conditions used to measure the IV. Also Sortwell #1 (Example 3) indicates that before the resulting polymer was used to treat the "10% solids clay (predominately sodium clays) slurries in water" the "polymers were dried and ground" by which it was understood that the aqueous gel polymer was further processed into a dry powder, as would be the normal method for the supply of commercially viable polymeric flocculants.

Attempts to prepare a similar polymer based on the disclosed details in Sortwell #1 were undertaken. Each gel was processed through to a dry powder product (as described in Examples 1-6, 8 and 9 above).

Samples F and G—0.04% Trilon™ C (chelating agent) addition to the aqueous monomer solution which was then degassed with $N_2$ for 45 minutes prior to initiation.

Sample H and J—0.04% Trilon™ C (chelating agent) addition to the aqueous monomer solution which was then degassed with $N_2$ for 45 minutes prior to initiation. Resultant aqueous gel held at 80° C. for 2 hours after completion of the polymerization process, prior to any further processing.

In all cases, it was found that the polymer produced was substantially insoluble, such that it was impossible to measure the IV of the polymer. Attempts were made to dissolve the dry polymer in deionized water, 1% NaCl solution and 1M NaCl solution without success. It was also found that all the preparations had high levels of residual acrylamide monomer such that the products would be classified as being toxic materials (according to GHS criteria), which would render them unsuitable for general application for industrial water and waste treatment processes. As the polymers so produced were all insoluble, it was not possible to elevate the effectiveness of these preparations in the treatment and dewatering of mineral clay, as further described in the examples of Sortwell #1. These test results are reported in Table 8.

This example demonstrates that Sortwell #1 provides insufficient information for the preparation of the claimed polymer and/or that the method disclosed is not viable for its production.

Example 14—20% Wt Ca Diacrylate, 20% Wt Na Acrylate Polymer (IV=15)

Water (65 g) and glacial acrylic acid (19 g) are added to a reaction vessel. Next, 30 wt % aqueous suspension of $Ca(OH)_2$ (~34 g) is added to this mixture slowly under cooling and pH control until pH 6.0±0.1 is reached. 35% aqueous solution of sodium acrylate (68.6 g), 51 wt % aqueous solution of Acrylamide (144 g), 5 wt % aqueous solution of Trilon™ C (3.0 g), defoamer (Xiameter™ AFE-0400), 1 wt % aqueous solution of Na-hypophosphite (0.2 g), and 4% ACVA in 5 wt % NaOH solution (3 g) are added and the pH is again adjusted with acetic acid to pH 6.0±0.1.

Next, addition water is added to reach the monomer solids of 30.5% (for calculation ACM, Ca-AA, Na-AA and unneutralised AA are taken into account). The reaction mixture is cooled down during degassing for 45 minutes. When a temperature of about −1° C. is reached, 4% AIBN solution in methanol (3 g), 1% aqueous solution of 2,2-Azobis (2-(2-imidazolin-2-yl)propan) dihydrochlorid (0.4 g) and 1% aqueous solution of tBHP (0.16 g) are added to the monomer solution and the degassing is continued for 2 minutes.

Next, at a temperature of 0° C.±1.0° C., the polymerization is initiated by adding the 1% aqueous solution of sodium metabisulphite solution (0.32 g). After the polymerization, the wet gel was placed in a heated cabinet at 80° C. for 2 hours. Next, the wet gel is minced, subsequently dried in a fluid bed dryer (55° C. for 2 hours), and finally ground to obtain a white/yellowish powder.

The polymer had the following characteristics:
IV: 14.5 dl/g
Gel content: 0%
Visual solubility: good
Solid content: 88.1%
Residual acrylamide: 200 ppm Example 15—Treatment of MFT from an Oilsands Mining Operation The 40% wt anionic polymer produced in Example 14 and a repeat preparation of Example 1 (designated here as Example 1A) were tested as flocculants in the treatment and dewatering of a slurry of mature fine tailings (MFT) from an oil sands mining operation. The protocol used was that described above in Example 7.

Figure 4:
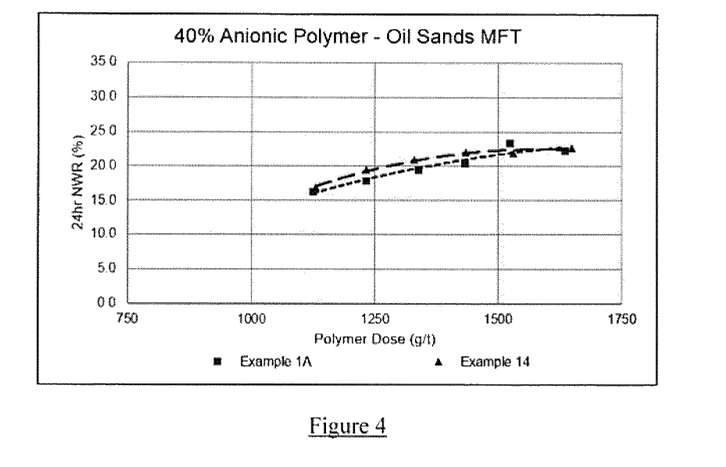
FIG. 4 illustrates results of testing of polymers produced in Examples 14 to treat a slurry of mature fine tailings (MFT).

Table 9 shows the test results obtained for the 40% wt anionic polymers; calcium diacrylate and the combined sodium/calcium neutralised acrylate (Examples 1A and 14, respectively). The 24 hour NWR data is also represented graphically in FIG. 4.

The results show that the both the polymers prepared by both wholly and partially neutralising the ethylenically unsaturated acid with calcium, are able to effectively treat, flocculate and dewater the oil sands, MFT slurry.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

40 wt % Calcium diacrylate polymers

| Oil sands MFT treated with: | Polymer Dose (g/t) | Conditioning Time (Secs) | Initial Yield Stress (Pa) | 24 hrs NWR (%) | 24 hrs Yield Stress (Pa) |
|---|---|---|---|---|---|
| Example 1 Polymer @ 0.5% | 1266 | 19 | 133 | 13.9 | 542 |
| | 1421 | 66 | 133 | 17.2 | 949 |
| | 1539 | 91 | 131 | 19.5 | 1011 |
| | 1574 | 140 | 147 | 21.7 | 1105 |
| | 1635 | 162 | 165 | 21.4 | 875 |
| | 1732 | 215 | 136 | 25.5 | 1261 |
| | 1815 | 264 | 149 | 21.1 | 1035 |
| | 1942 | 343 | 112 | 15.3 | 633 |
| | 2043 | 438 | NA | 11.7 | 559 |
| Example 2 Polymer @ 0.5% | 1020 | 5 | 88 | 16.5 | 873 |
| | 1172 | 7 | 125 | 22.4 | 841 |
| | 1220 | 6 | 141 | 22.1 | 1257 |
| | 1278 | 7 | 134 | 23.0 | 1039 |
| | 1375 | 7 | 124 | 20.3 | 781 |
| | 1525 | 6 | 121 | 17.3 | 806 |
| Example 3 Polymer @ 0.5% | 1115 | 9 | 116 | 15.7 | 423 |
| | 1272 | 25 | 143 | 23.8 | 930 |
| | 1369 | 36 | 135 | 23.3 | 848 |
| | 1427 | 54 | 172 | 28.8 | 1260 |
| | 1528 | 52 | 165 | 27.8 | 996 |
| | 1769 | 112 | 137 | 18.2 | 911 |
| Example 4 Polymer @ 0.5% | 1355 | 10 | 101 | 13.0 | 695 |
| | 1445 | 6 | 113 | 12.1 | 828 |
| | 1556 | 4 | 131 | 9.3 | 749 |
| | 1706 | 3 | 125 | 10.8 | 1085 |
| | 1775 | 3 | 124 | 9.4 | 830 |
| | 2044 | 4 | 89 | 5.6 | 731 |

TABLE 2

60 wt % Calcium diacrylate polymers

| Oil sands MFT treated with: | Polymer Dose (g/t) | Conditioning Time (Secs) | Initial Yield Stress (Pa) | 24 hrs NWR (%) | 24 hrs Yield Stress (Pa) |
|---|---|---|---|---|---|
| Example 5 Polymer @ 0.5% | 1325 | 16 | 48 | 1.6 | UR |
| | 1542 | 6 | 110 | 8.0 | 537 |
| | 1688 | 8 | 184 | 14.0 | 1219 |
| | 1775 | 8 | 168 | 14.2 | 1041 |
| | 1871 | 8 | 187 | 12.6 | 870 |
| | 2037 | 8 | 146 | 12.0 | 1406 |

TABLE 2-continued

| 60 wt % Calcium diacrylate polymers | | | | | |
|---|---|---|---|---|---|
| Oil sands MFT treated with: | Polymer Dose (g/t) | Conditioning Time (Secs) | Initial Yield Stress (Pa) | 24 hrs NWR (%) | 24 hrs Yield Stress (Pa) |
| Example 6 Polymer @ 0.5% | 1375 | 8 | 138 | 4.1 | 277 |
|  | 1559 | 11 | 139 | 15.0 | 549 |
|  | 1781 | 18 | 132 | 7.6 | 527 |
|  | 1947 | 41 | 163 | 14.3 | 943 |
|  | 2037 | 50 | 189 | 12.5 | 840 |
|  | 2283 | 101 | 179 | 12.4 | 876 |

TABLE 3

| Calcium and Magnesium diacrylate polymers | | | | | |
|---|---|---|---|---|---|
| Oil sands MFT treated with: | Polymer Dose (g/t) | Conditioning Time (Secs) | Initial Yield Stress (Pa) | 24 hrs NWR (%) | 24 hrs Yield Stress (Pa) |
| Example 8 Polymer @ 0.5% | 1019 | 12 | 54.1 | 6.6 | 128.0 |
|  | 1129 | 13 | 68.5 | 8.7 | 151.0 |
|  | 1320 | 15 | 69.4 | 17.5 | 307.2 |
|  | 1430 | 17 | 64.3 | 17.9 | 360.0 |
|  | 1520 | 18 | 77.0 | 21.0 | 356.8 |
|  | 1735 | 36 | 126.9 | 22.1 | 744.0 |
| Example 9 Polymer @ 0.5% | 1241 | 12 | 70.5 | 19.1 | 392.0 |
|  | 1337 | 4 | 78.2 | 20.6 | 465.5 |
|  | 1441 | 19 | 74.0 | 22.1 | 444.8 |
|  | 1534 | 20 | 72.8 | 23.5 | 566.4 |
|  | 1747 | 41 | 130.8 | 24.0 | 787.2 |
|  | 1845 | 55 | 97.7 | 22.0 | 760.0 |

TABLE 4

| Calcium diacrylate polymer | | | |
|---|---|---|---|
| Mineral sands tailings treated with: | Polymer Dose (g/t) | Estimated Yield Stress (Pa) | 5 mins NWR (%) |
| Example 1 Polymer @ 0.25% | 138 | 54 | 35 |
|  | 173 | 54 | 34 |
|  | 208 | 63 | 35 |
|  | 234 | 98 | 40 |
|  | 260 | 184 | 39 |

TABLE 5

| Reagents Used in Example 12 | |
|---|---|
| Reagent | Weight % |
| Calcium diacrylate | 13.0 |
| Acrylamide | 7.0 |
| Demineralized water | 79.99 |
| 2,2'-Azobis [2-(imidazolin-2-yl)propane] dihydrochloride | 0.0018 |
| t-butyl Hydroperoxide | 0.0063 |
| Sodium bisulfate | 0.0023 |

TABLE 6

| Product Properties (Example 12) | | | | | | |
|---|---|---|---|---|---|---|
|  | Aqueous Gel Polymer | | | Dry Powder Polymer | | |
| Sample | Solubility | ACM (ppm) | IV (dl/g) | Solubility | ACM (ppm) | IV (dl/g) |
| A | Insoluble | 5700 | NT | Insoluble | 8500 | NT |
| B | Insoluble | 1760 | NT | Insoluble | 5500 | NT |
| C | Very Poor | NT | 7.6 | NT | NT | NT |
| D | Very Poor | NT | 9.7 | NT | NT | NT |
| E | Very Poor | NT | 6.6 | NT | NT | NT |

TABLE 7

Reagents Used in Example 13

| Reagent | Weight % |
|---|---|
| Calcium diacrylate | 15.6 |
| Acrylamide | 8.4 |
| Demineralized water | 75.99 |
| Ammonium persulfate | 0.0009 |
| Sodium bisulfite | 0.0014 |
| 2.2:azobis (2-amidinopropane) dihydrochloride | 0.0001 |

TABLE 8

Product Properties (Example 13)

Dry Powder Polymer

| Sample | Solubility | ACM (ppm) | IV (dl/g) |
|---|---|---|---|
| F | Insoluble | 26,800 | NT |
| G | Insoluble | 40,000 | NT |
| H | Insoluble | 50,400 | NT |
| J | Insoluble | 33,400 | NT |

TABLE 9

40% Anionic polymers

| Oil sands MFT treated with: | Polymer Dose (g/t) | Conditioning Time (Secs) | Initial Yield Stress (Pa) | 24 hrs NWR (%) | 24 hrs Yield Stress (Pa) |
|---|---|---|---|---|---|
| Example 1A Polymer @ 0.5% | 1125 | 16 | 83 | 16.3 | 254 |
| | 1232 | 13 | 0 | 17.9 | 611 |
| | 1338 | 17 | 92 | 19.5 | 584 |
| | 1433 | 22 | 96 | 20.4 | 934 |
| | 1525 | 88 | 91 | 23.3 | 1032 |
| | 1636 | 97 | 108 | 22.2 | 1059 |
| Example 14 Polymer @ 0.5% | 1130 | 13 | 98 | 16.9 | 565 |
| | 1233 | 21 | 80 | 19.5 | 872 |
| | 1330 | 63 | 92 | 20.9 | 830 |
| | 1434 | 120 | 95 | 22.0 | 998 |
| | 1532 | 223 | 110 | 21.9 | 1144 |
| | 1649 | 282 | 127 | 22.6 | 1157 |

What is claimed is:

1. A multivalent cation containing copolymer, which is water-soluble and in particulate form, wherein the multivalent cation containing copolymer is derived from one or more ethylenically unsaturated acids, the copolymer having the following characteristics:
 (a) an intrinsic viscosity of at least about 3 dl/g when measured in 1 M NaCl solution at 25° C.;
 (b) the copolymer is a reaction product of a monomer mixture comprising an ethylenically unsaturated acid in an amount in the range of from about 5% to about 65% by weight and at least one comonomer selected from the group consisting of acrylamide, methacrylamide and any mixture thereof; and
 (c) a residual comonomer content is less than 1000 ppm when the comonomer is an acrylamide,
 wherein the multivalent cation containing copolymer has a gel content measurement of less than 50% gel.

2. The multivalent cation containing copolymer of claim 1, in the form of a calcium copolymer.

3. The multivalent cation containing copolymer of claim 1, in the form of a magnesium copolymer.

4. The multivalent cation containing copolymer of claim 1, wherein the at least one comonomer is acrylamide.

5. The multivalent cation containing copolymer of claim 1, wherein the ethylenically unsaturated acid is selected from the group consisting of acrylic acid, methacrylic acid, itaconic acid, crotonic acid, fumaric acid, acrylamido tertiary butyl sulfonic acid (ATBS) and any mixture of two or more of these.

6. The multivalent cation containing copolymer of claim 1, wherein the ethylenically unsaturated acid is selected from the group consisting of acrylic acid, methacrylic acid, acrylamido tertiary butyl sulfonic acid (ATBS) and any mixture of two or more of these.

7. The multivalent cation containing copolymer of claim 1, wherein the ethylenically unsaturated acid is acrylic acid.

8. The multivalent cation containing copolymer of claim 1, wherein the ethylenically unsaturated acid is present in an amount in the range of from about 15% to about 65% by weight.

9. The multivalent cation containing copolymer of claim 1, wherein the ethylenically unsaturated acid is present in an amount in the range of from about 20% to about 65% by weight.

10. The multivalent cation containing copolymer of claim 1, wherein the ethylenically unsaturated acid is present in an amount in the range of from about 35% to about 65% by weight.

11. The multivalent cation containing copolymer of claim 1, wherein the intrinsic viscosity is in the range of from about 4 to about 25 dl/g when measured in 1 M NaCl solution at 25° C.

12. The multivalent cation containing copolymer of claim 1, wherein the intrinsic viscosity is in the range of from about 4 to about 20 dl/g when measured in 1 M NaCl solution at 25° C.

13. The multivalent cation containing copolymer of claim 1, wherein the intrinsic viscosity is in the range of from about 5 to about 15 dl/g when measured in 1 M NaCl solution at 25° C.

14. The multivalent cation containing copolymer of claim 1, in solid form.

15. The multivalent cation containing copolymer of claim 1, in substantially a spherical particulate form.

16. The multivalent cation containing copolymer of claim 1, in powder form.

17. The multivalent cation containing copolymer of claim 1, in bead form.

18. The multivalent cation containing copolymer of claim 1, in the form of a reverse-phase emulsion.

19. The multivalent cation containing copolymer of claim 1, in the form of a reverse-phase dispersion.

20. The multivalent cation containing copolymer of claim 1, in the form of an aqueous solution.

21. The multivalent cation containing copolymer of claim 1, in the form of an aqueous dispersion.

22. The multivalent cation containing copolymer of claim 1, wherein the residual comonomer (ACM) content is less than about 500 ppm when the comonomer is an acrylamide.

23. The multivalent cation containing copolymer of claim 1, wherein the residual comonomer (ACM) content is in the range of from about 300 ppm to about 500 ppm when the comonomer is an acrylamide.

24. The multivalent cation containing copolymer of claim 1, in a substantially pure form.

25. The multivalent cation containing copolymer of claim 1, in isolated form.

26. The multivalent cation containing copolymer of claim 1, wherein the copolymer has an anionic content in the range of from about 20 to about 65 weight percent.

27. The multivalent cation containing copolymer of claim 1, wherein the copolymer has an anionic content in the range of from about 25 to about 65 weight percent.

28. The multivalent cation containing copolymer of claim 1, wherein the copolymer has an anionic content in the range of from about 30 to about 65 weight percent.

29. The multivalent cation containing copolymer of claim 1, wherein the copolymer has an anionic content in the range of from about 40 to about 65 weight percent.

30. A process for treating an aqueous slurry comprising particulate material, the process comprising contacting the aqueous slurry with the multivalent cation containing copolymer of claim 1.

31. The process of claim 30, further comprising thickening the aqueous slurry.

32. The process of claim 30, further comprising sedimentation of the aqueous slurry.

33. The process of claim 30, further comprising dewatering the aqueous slurry.

34. The process of claim 30, further comprising compaction and/or consolidation of the aqueous slurry.

35. The process of claim 30, further comprising flocculation of the aqueous slurry.

36. The process of claim 30, further comprising coagulation of the aqueous slurry.

37. The process of claim 30, wherein the aqueous slurry comprises tailings.

38. The process of claim 30, wherein the aqueous slurry comprises mature fine tailings (MFT).

39. The process of claim 30, wherein the aqueous slurry comprises fluid fine tailings (FFT).

40. The process of claim 30, wherein the aqueous slurry comprises thin fine tailings (TFT).

41. The process defined in claim 30, wherein the aqueous slurry comprises whole tailings (WT).

42. A process for treating an aqueous slurry comprising particulate material, the process comprising contacting the aqueous slurry with an aqueous solution comprising the multivalent cation containing copolymer of claim 1.

43. A process for producing the multivalent cation containing copolymer of claim 1, comprising:
    contacting a multivalent cation containing ethylenically unsaturated acid and at least one comonomer to produce a monomer mixture comprising the multivalent cation containing ethylenically unsaturated acid present in an amount in the range of from about 5% to about 65% by weight; and
    contacting the monomer mixture with a thermal initiator to cause the multivalent cation containing ethylenically unsaturated acid and the at least one comonomer to react to produce the multivalent cation containing copolymer.

44. The process of claim 43, wherein the multivalent cation containing ethylenically unsaturated acid is a multivalent cation containing diacrylate.

45. The process of claim 43, wherein the thermal initiator comprises an azo compound.

46. The process of claim 43, wherein the thermal initiator is selected from the group consisting of azobisisobutyronitrile (AIBN), 4,4'-azobis-(4-cyanovalereic acid) (ACVA) and any mixture thereof.

47. The process of claim 43, further comprising contacting the monomer mixture with a redox initiator comprising a reducing compound and an oxidizing compound.

48. The process of claim 47, wherein the reducing compound is selected from the group consisting of sodium sulphite, sulphur dioxide, sodium metabisulphite and any mixture thereof.

49. The process of claim 47, wherein the oxidizing compound is selected from the group consisting of ammonium persulphate, tertiary butyl hydroperoxide and any mixture thereof.

* * * * *